United States Patent
Gianfranceschi

(10) Patent No.: US 10,557,728 B2
(45) Date of Patent: Feb. 11, 2020

(54) SENSOR MOUNT

(71) Applicant: Microtecnica S.r.l., Turin (IT)

(72) Inventor: Marco Gianfranceschi, Turin (IT)

(73) Assignee: MICROTECNICA S.R.L., Turin (IT)

(*) Notice: Subject to any disclaimer, the term of this patent is extended or adjusted under 35 U.S.C. 154(b) by 612 days.

(21) Appl. No.: 15/198,023

(22) Filed: Jun. 30, 2016

(65) Prior Publication Data

US 2017/0003148 A1    Jan. 5, 2017

(30) Foreign Application Priority Data

Jul. 1, 2015    (EP) .................................. 15174906.6

(51) Int. Cl.
   *G01D 11/24*    (2006.01)
   *F16M 13/02*    (2006.01)
   *G01D 5/14*    (2006.01)

(52) U.S. Cl.
   CPC ......... *G01D 11/245* (2013.01); *F16M 13/022* (2013.01); *G01D 5/145* (2013.01)

(58) Field of Classification Search
   None
   See application file for complete search history.

(56) References Cited

U.S. PATENT DOCUMENTS

| 3,728,541 A | 4/1973 | Rabinovich et al. |
| 4,185,908 A * | 1/1980 | Taylor ................... B65H 5/026 198/813 |
| 4,201,951 A * | 5/1980 | Mohler ..................... H01S 3/02 372/107 |
| 4,600,301 A | 7/1986 | Snyder |
| 6,191,848 B1 * | 2/2001 | Armitage .................. G01J 1/02 356/213 |
| 2012/0223703 A1 * | 9/2012 | Ludwig .................. G01D 5/147 324/207.25 |
| 2013/0207332 A1 * | 8/2013 | Li ............................ B23Q 1/25 269/73 |

OTHER PUBLICATIONS

EP Communication for Application No. 15174906.6-1022 dated Mar. 19, 2018, 6 pages.
Extended European Search Report of the European Patent Office for International Application No. EP15174906.6, dated Nov. 13, 2015, 7 pages.

* cited by examiner

*Primary Examiner* — Nasima Monsur
(74) *Attorney, Agent, or Firm* — Cantor Colburn LLP

(57) ABSTRACT

A mount for a sensor includes a first mount part for mounting a sensor part and a second mount part for mounting the first mount part. A first adjustment mechanism is provided to adjust the first mount part relative to the second mount part and a second adjustment mechanism is provided to adjust the second mount part relative to a support. At least one of the first adjustment mechanism and the second adjustment mechanism is a vernier adjustment mechanism.

13 Claims, 3 Drawing Sheets

Sensor measures predominantly south pole magnetic field

Sensor measures neutral magnetic field

Sensor measures predominantly north pole magnetic field

SENSOR MOUNT

FOREIGN PRIORITY

This application claims priority to European Patent Application No. 15174906.6 filed Jul. 1, 2015, the entire contents of which is incorporated herein by reference.

TECHNICAL FIELD

This disclosure relates to mounting arrangements for sensors and to sensors mounted in such mounting arrangements. In particular, this disclosure relates to adjustable mounting arrangements for magnetic sensors such as Hall effect sensors.

BACKGROUND

The mounting of sensor parts can have a strong impact on the signal that is output by the sensor. For example, the distance of the sensor from the object being sensed and the relative orientation of the two can affect the signal significantly.

In traditional mounting arrangements, the variation in position and orientation of the sensor parts from one installation to another generally requires some form of calibration and signal adjustment or compensation in signal processing. For example, in the case of an actuator, the sensor output signal strength can be measured across the movement range of the actuator and the range of signal strengths can be mapped to the actuator positions. However, this calibration process must be carried out in software after installation and the results must be stored (e.g. in a memory or in a look-up table) and consulted for every reading. Therefore this calibration and compensation requires a certain amount of processing overhead and additional setup which can be inconvenient and is undesirable.

The positional mounting of a sensor can vary for different reasons. For example, the method of attachment might not be very precise (e.g. using adhesive of varying thickness) or the position may vary due to the positioning limits imposed by manufacturing tolerances.

SUMMARY

According to this disclosure there is provided a mount for a sensor, comprising: a first mount part for mounting a sensor part; and a second mount part for mounting the first mount part; wherein a first adjustment mechanism is provided to adjust the first mount part relative to the second mount part and a second adjustment mechanism is provided to adjust the second mount part relative to a support; and wherein at least one of the first adjustment mechanism and the second adjustment mechanism is a vernier adjustment mechanism.

By providing a mechanical adjustment mechanism the sensor can effectively be calibrated at the time of installation so that all installed sensors are positioned at the correct position and/or orientation. In this way the software calibration and compensation can be avoided as the signal output can be expected to be consistent across devices.

The vernier adjustment mechanism allows for particularly accurate positional alignment and/or orientation, thus making accurate mechanical calibration possible. The use of a vernier adjustment mechanism provides sufficiently accurate mechanical adjustment that further electronic or software calibration and compensation is not required, thus simplifying the use of the sensor and ensuring the interchangeability without need of electronic calibration.

Some sensors may have only a single sensor part, e.g. a light sensor or temperature sensor, in which case that sensor part can be installed in the mount and mechanically positioned accurately in relation to the region to be sensed. Other sensors have two or more sensor parts, e.g. position sensors such as those used to monitor actuators may have a detector part and a detected part. As an example, magnetic sensors such as hall effect sensors have two parts: a magnet and a magnetic detector. In such cases, either part may be positioned within the sensor mount according to the convenience of the particular installation. The other part will typically be mounted on the support (or in fixed relation relative to the support) so that the position and/or orientation of one sensor part can be adjusted relative to the other sensor part.

In some preferred examples the vernier adjustment mechanism comprises a first array of first alignment features being spaced apart by a first spacing and a second array of second alignment features being spaced apart by a second spacing different from the first spacing, the arrays being arranged such that alignment of a selected first alignment feature with a selected second alignment feature defines the adjustment of the vernier adjustment mechanism.

The vernier adjustment mechanism operates along a similar principle to a vernier measurement scale. The difference between the alignment feature spacings of the first and second arrays means that when a selected pair of features (i.e. one feature from each array) are aligned, the neighbouring pair will be misaligned by the difference between the spacings. The next neighbouring pair will be further misaligned by this distance again. Coarse adjustments can be made by aligning the selected feature of one array with different features of the other array. Coarse adjustments are thus adjustments by an amount equal to an integer number of the alignment feature spacing measurement. Fine adjustments can be made by changing the selected feature of both arrays. The smallest fine adjustment that can be made is thus the difference between the first and second spacings, with multiples of that adjustment also being possible by further moving the selected feature of both arrays.

The alignment features may take many different forms so long as a selected feature of the first array can be fixed in alignment with a selected feature of the second array such so as to define the relative positional arrangement of the two parts on which the features are formed. For example two arrays of projections could be used, with a fixing means (such as a clip or band) that connects to one projection of each array, holding them adjacent to one another. In some preferred examples, the first alignment features are notches. In some preferred examples the second alignment features are notches. It will be appreciated that it is possible for the two arrays to use different forms of feature, for example an array of notches could be aligned with an array of projections with the right alignment means, but it is particularly convenient for the arrays to use the same or similar features. In some preferred examples two arrays of notches are used. The notches may be narrow slots (e.g. square-sided slots) or they may be in the form of circular arcs (e.g. semi-circular or near-semi-circular indents) that may be aligned with a pin or bar that bridges the boundary between the two arrays and engages with a notch (slot or indent) of each array so as to restrict relative movement of one array relative to the other array. Adjustment is performed by moving the pin from one pair of notches to a different pair of notches. Thus in some examples, the mount may further comprise a pin insertable into the notches such that it is partially enclosed by both a selected one of the first notches and a selected one of the second notches. This arrangement is particularly compact and mechanically simple. It will be appreciated that the shape of the pin will be designed to match the shape of the notches and preferably closely matches the shape and dimensions of the notches so as to limit relative movement once the pin is in place.

A strong advantage of the above arrangement is that the adjustment mechanism can be used in confined spaces where there is limited space for mechanical adjustment devices. The use of alignment arrays is extremely compact and avoids the need for a lot of additional structure that would be required for other types of adjustment mechanism. Additionally, the avoidance of additional structure has excellent implications on the weight. The adjustment mechanisms described above are also extremely low mass and light weight. Low weight is especially advantageous in aerospace applications where installation space can also be confined, and where sensors for safety monitoring are important and beneficial. This can be particularly important for example when used for sensing the position of actuators in confined spaces such as helicopter blades.

Linear vernier adjustment mechanisms may be used to adjust relative position. E.g. the can be used to adjust position in two (possibly orthogonal) dimensions. Such linear vernier adjustment mechanisms have each array of features forming a straight line with the arrays position adjacent to one another. However, in some preferred examples, the vernier adjustment mechanism is a circular vernier adjustment mechanism. A circular vernier adjustment mechanism has each array of features formed in a circular arc, with the two arcs arranged adjacent to one another so that relative rotation of the arcs will move one array relative to the other. The mount parts may be formed as full circles or may have the arrays formed on an arcuate portion thereof. In the former case, the arcs may be full circles or they may be formed around only a part of the circle. The features may be arranged with one array of features formed on an external (convex) side of one mount part and the other array formed on an internal (concave) side of the other mount part so that the two arrays of features face each other across the boundary between the two parts.

In some preferred examples, the vernier adjustment mechanism comprises a first array of first alignment features forming a circular arc and being spaced apart by a first spacing and a second array of second alignment features forming a circular arc and being spaced apart by a second spacing different from the first spacing, the arrays being arranged such that alignment of a selected first alignment feature with a selected second alignment feature defines the adjustment of the vernier adjustment mechanism.

As discussed above, the first and second adjustment mechanisms could be used to adjust to positional dimensions. However, in some sensors, the relative orientation of sensor parts has a strong influence on the output signal strength. For example, this is particularly the case with magnetic sensors in which the orientation of the magnet's magnetic field with respect to the magnetic detector influences the magnetic interaction and thus the output signal strength. Aligning the magnet to be accurately orientated with respect to the sensor (typically so that the field is perpendicular to the sensor at a certain position, but this need not necessarily be the case) ensures consistency of signal strength (and signal strength variation) across different devices. It will be appreciated that the circular vernier adjustment mechanisms described above lend themselves particularly well to orientation adjustment.

For the most accurate adjustment, many sensors will benefit from both a positional adjustment and an orientation adjustment. For example in a magnetic sensor, as well as orienting the magnet and sensor relative to each other, the distance between them will affect the magnetic interaction and thus the signal strength between them. Therefore in some preferred examples one of the first and second adjustment mechanisms is arranged to adjust the orientation of the sensor part and the other of the first and second adjustment mechanisms is arranged to adjust the position of the sensor part relative to the support. Although the adjustment mechanisms could be either way around, in some particularly preferred examples, the first adjustment mechanism is arranged to adjust the orientation of the sensor part. Additionally or alternatively, in some preferred examples the second adjustment mechanism is arranged to adjust position of the sensor part.

In some examples it is preferred that the vernier adjustment mechanism (whether it is the first adjustment mechanism or the second adjustment mechanism) is arranged to adjust the orientation of the sensor part. The orientation often has the greatest influence on the sensor part alignment and thus it obtains the greatest advantage from the vernier adjustment which allows for more precise alignment via its finer adjustment potential.

In many preferred examples both the first adjustment mechanism and the second adjustment mechanism are vernier adjustment mechanisms. In this way the maximum precision can be obtained in all adjustments, e.g. in two dimensions of positional adjustment or with one position and one orientation adjustment.

It will be appreciated that further adjustments can also be included, e.g. third and/or fourth adjustment mechanisms for additional positional dimensions, with or without orientation adjustment. Any or all may be vernier adjustments according to the requirements of the system.

The second mount part may be circular (or may be circular in cross-section, e.g. a circular cylinder) and the first mount part may be mounted off centre in the second mount part. Adjustment (i.e. rotation) of the second mount part will thus alter the position of the first mount part and thus the position of the sensor part. In particularly preferred examples, both the first mount part and second mount part are circular (or circular cross-section), with the first mount part mounted off centre in the second mount part. Thus the first mount part can be adjusted so as to adjust the orientation of the sensor part and the second mount part can be adjusted so as to adjust the position of the sensor part. In the adjustment procedure, it is preferred to adjust the second mount part first as this will have an effect on both position and orientation. Orientation can then be corrected and properly aligned via the purely orientational first adjustment mechanism.

According to this disclosure there is also provided a sensor comprising a mount as described above, optionally including any or all of the preferred features also described herein.

According to another aspect of this disclosure, there is provided a hall effect sensor comprising a magnet, a detector and a mount as described above, optionally including any or all of the preferred features also described herein, and wherein one of the magnet and the detector is mounted in the first sensor part and is adjustable relative to the other of the magnet and detector. The magnet may be a diametrically magnetized neodymium magnet. The magnet may be generally cylindrical in shape and be arranged to slot into a cylindrically shaped first mount part.

In the case of a two (or more) part sensor, the second sensor part is preferably mounted to the support (or in fixed relation to the support). The second sensor part may be a detector that detects an effect created by the first sensor part. For example, a magnetic sensor (e.g. hall effect sensor) can sense the effect of a magnet by detecting the strength of magnetic field. A capacitive sensor may sense variations in electric field according to the proximity of a charged sensor part. A photo detector can detect variations in illumination from the proximity and direction of a light source. Many other sensors may benefit from the mount described herein. Being mounted to the support, the second sensor part may preferably be a detector that outputs a voltage signal that is dependent on the position and/or orientation of the other sensor part. The detector part will typically be operationally connected to other electronics such as signal processing circuitry and thus is preferentially arranged on a fixed support rather than a moving part, although other implementations are of course possible.

According to a further aspect, this disclosure provides a method of mounting a sensor part comprising: mounting the sensor part to a first mount part; mounting the first mount part to a second mount part via a first adjustment mechanism; mounting the second mount part to a support via a second adjustment mechanism; wherein at least one of the first adjustment mechanism and the second adjustment mechanism is a vernier adjustment mechanism; and adjusting the first and second adjustment mechanisms to adjust the position and/or orientation of the sensor part relative to the support.

The optional and preferred features described above in relation to the sensor mount also apply to the method. For example, the vernier adjustment may involve coarse and/or fine adjustments by adjusting the position of an alignment fixing means such as a pin, clip, clasp or band. The vernier adjustments may either or both by linear or circular. In particular, in the case of two circular sensor parts, the step of adjusting the positional alignment is preferably carried out before correcting orientation with a purely orientational adjustment mechanism.

BRIEF DESCRIPTION OF DRAWINGS

One or more non-limiting examples will now be described, by way of example only, and with reference to the accompanying figures in which.

DETAILED DESCRIPTION OF THE INVENTION

Figure 1:
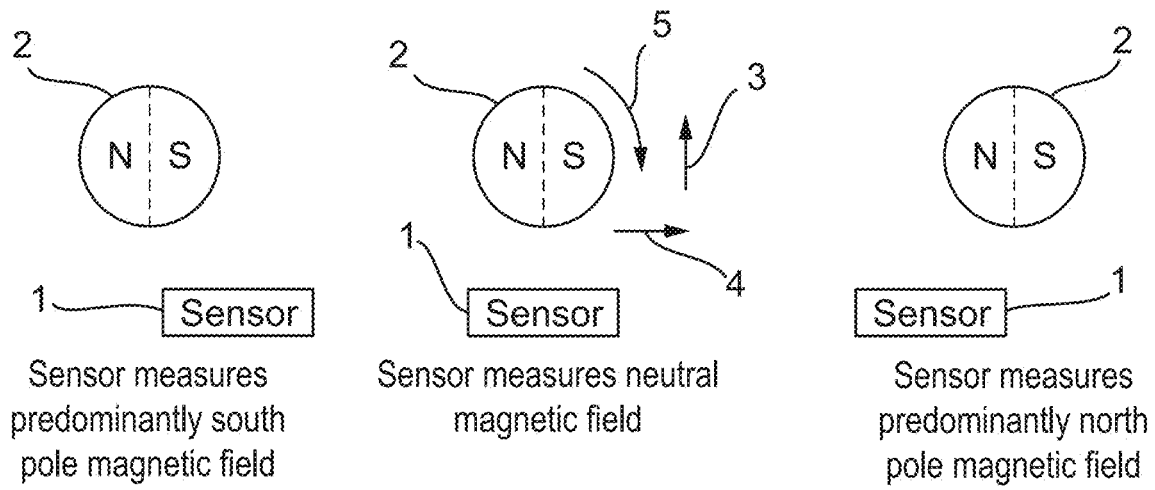
FIG. 1 illustrates the problem of sensor alignment.

FIG. 1 shows a magnetic sensor 1 and a magnet 2. The magnet 2 is in close proximity to the magnetic sensor 1 and is movable relative to the magnetic sensor 1. As the magnet 2 moves with respect to sensor 1, the output voltage of sensor 1 varies due to the change in magnetic field at the sensor 1. The magnet 2 is diametrically magnetized such that the left hand side of the magnet 2 (as shown in the figure) is the North pole and the right hand side is the South pole. FIG. 1 shows the magnet 2 and sensor 1 in three different positions. In the left hand configuration of FIG. 1 the magnet 2 is displaced to the left such that the north pole is further from the sensor 1 than the south pole. The sensor 1 measures predominantly the south pole magnetic field. In the right hand configuration of FIG. 1 the magnet 2 is displaced to the right such that the south pole is further from the sensor 1 than the north pole. The sensor 1 measures predominantly the north pole magnetic field. The central configuration of FIG. 1 shows the magnet 2 in a neutral position with respect to sensor 1 such that the sensor 1 measures a neutral magnetic field.

The three positions of FIG. 1 show the extreme positions of the movement that is expected of the magnet (i.e. movement parallel to the sensor surface). The sensor 1 produces an output voltage proportional to the magnetic field. The magnetic field is determined by the position of the magnet relative to the sensor. It can thus be appreciated from FIG. 1 that the output of sensor 1 is strongly dependent on both the polarity and distance of the magnet 2 from the sensor 1, i.e. it is dependent on both the location and orientation of the magnet 2 relative to sensor 1. For example, if the magnet 2 were to be positioned further from the sensor 1 (i.e. displaced in the direction of arrow 3 in FIG. 1), the magnitude of the output from sensor 1 would be lower due to the weaker magnetic field. Similarly, if magnet 2 were to be positioned such that its neutral position was displaced to one side (e.g. as indicated by arrow 4 in FIG. 1), the magnitude of the sensor output would be slightly lower due to the increased distance and the sensor output would indicate a field more strongly influenced by the north pole of the magnet 2. Finally, if the magnet 2 were to be rotated such that its magnetization axis was not exactly parallel with the sensor surface, e.g. rotated clockwise as shown by arrow 5 in FIG. 1 then readings of the sensor in the neutral position would indicate a field influenced more strongly by the south pole of the magnet 2.

Therefore variations in the relative positioning and orientation of the magnet 2 with respect to sensor 1 due for example to tolerances in the manufacturing and assembly processes can result in variations in the detected signal strength between devices. That is to say using the same manufacturing and assembly process for two devices may result in those two devices having different sensor outputs. This generally requires some form of signal calibration in software or hardware so that the sensor output is properly interpreted.

Figure 2A:
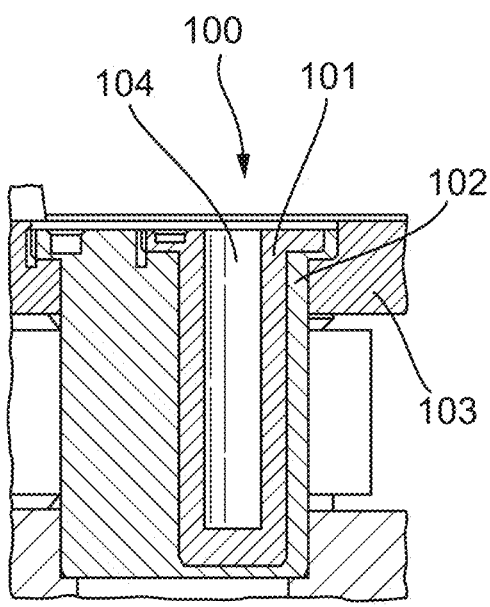
FIGS. 2a and 2b show a first example of a sensor mount.
Figure 2B:
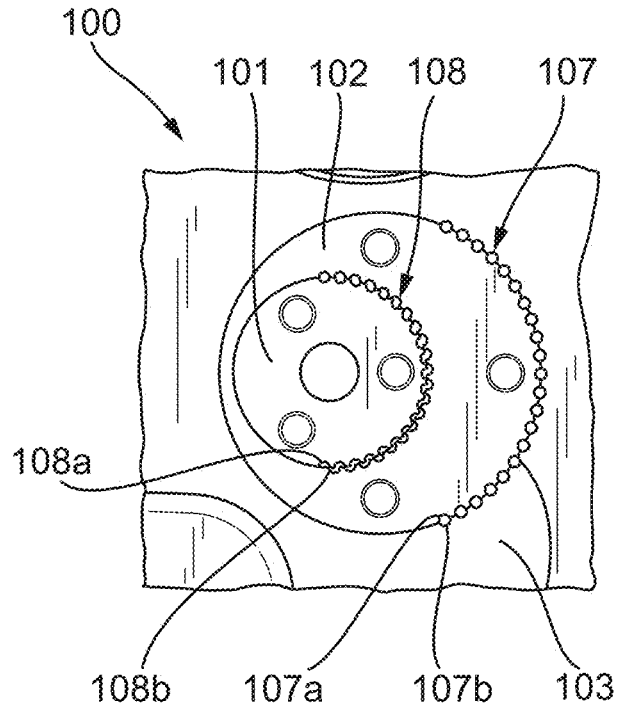

FIGS. 2a and 2b show a side cross-section view and a top view of a first example of a sensor mount 100. The sensor mount 100 comprises a first mount part 101 that is an inner or central mount part and a second mount part 102 that is an outer mount part. The second mount part 102 is adjustably mounted to a support 103 and the first mount part 101 is adjustably mounted to the second mount part 102. First mount part 101 has a cylindrical recess 104 into which one sensor part can be inserted. In the design shown in the figures, the recess 104 is designed to accommodate a diametrically magnetized magnet. However, it will be appreciated that the apparatus can easily be adapted to hold other types of sensor part, e.g. optical or capacitive elements. Equally the first mount part 101 could hold the magnetic sensor (or other type of sensor) rather than the magnet.

Figure 3A:
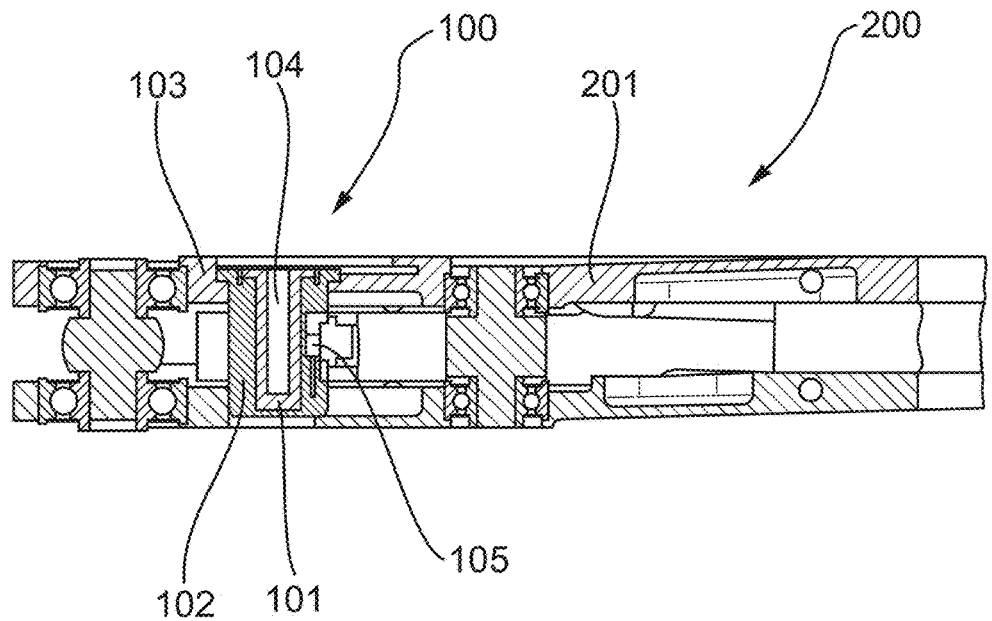
FIGS. 3a and 3b show cross-sectional views of a second example of a sensor mount.
Figure 3B:
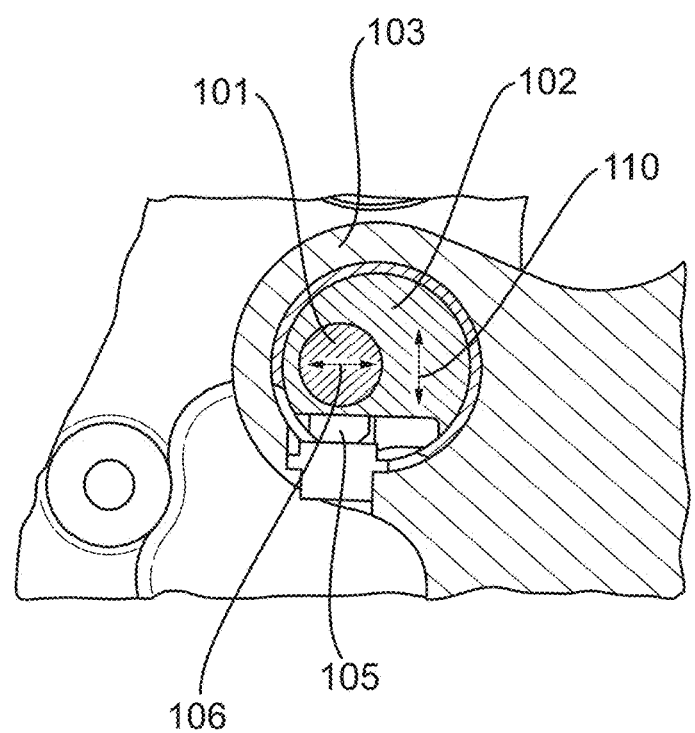

FIGS. 3a, 3b, 4a and 4b show a second example of a sensor mount 100. FIGS. 3a and 3b are sectional views that show a sensor mount 100 installed in a pivot lever 201 that is part of an electro-mechanical actuator assembly 200. The sensor mount 100 is extremely compact and space efficient, allowing it to be installed into the actuator assembly 200 without impacting significantly on the envelope and weight of the assembly 200. This is of great practical importance in many applications where size and weight are highly constrained, but where sensors are desired, or required. One application is for detecting mechanical failures within the actuator 200. As one example, size and weight are of high importance in aerospace applications, e.g. aerospace actuators. Detection of mechanical failure within such applications is also of high importance from a safety perspective. However it will be appreciated that the sensor is also applicable in many other applications and in other areas of technology.

As shown in FIGS. 3a and 3b, a sensor 105 is mounted in a fixed relationship to the support 103. The support 103 may be a structure that is fixed and with respect to which the actuator (and thus the sensor mount 100) moves during operation. This movement is indicated by arrow 106 in FIG. 3b and in this example is substantially parallel to the surface of the sensor 105. It will be appreciated however that the movement could be in another direction, e.g. perpendicular to the surface of the sensor 105 or at some other angle. The variation in distance and orientation caused by this relative movement of the mount 100 relative to the sensor 105 is detected by the sensor 105 and output, e.g. as a voltage for use by other processing systems.

FIG. 2b shows the adjustment mechanisms of the first example by which the first mount part 101 is adjustable relative to the second mount part 102 and by which the second mount part 102 is adjustable relative to the support 103.

In this example, the outer adjustment mechanism 107 between the second mount part 102 and the support 103 is a discrete, non-vernier adjustment mechanism. Each of the second mount part 102 and the support 103 is provided with an array of notches 107a, 107b (specifically circular arcs forming semi-circles or near-semi-circles in this example). The arrays 107a, 107b are circular arrays provided around the circular border between the second mount part 102 and the support 103. In this example, each array 107a, 107b has twenty-one notches, but that is purely exemplary. It is not required that both arrays have the same number of notches. The relative orientation of the second mount part 102 with respect to the support 103 is determined by aligning a selected notch of one array 107a with a selected notch of the other array 107b. The particular selections from each array determine the relative orientation. When aligned, the two selected notches together form a hole (a circular hole in this example) into which a pin (not shown) of matching diameter can be inserted such that it bridges the join between the two selected notches and prevents relative rotation of the second mount part 102 relative to the support 103. As this adjustment mechanism 107 is non-vernier, the spacing between notches is such that when one pair of notches from the opposed arrays 107a, 107b is aligned, adjacent pairs of notches are also aligned. The alignment of the two parts can then be fixed in that position by placing a pin into any of the holes formed by any pair of notches. To adjust the alignment, the two parts are moved relative to one another such that the notches on one part align with different notches on the other part. Alignment is thus adjusted in discrete steps, each step being equivalent to the separation of two adjacent notches in the arrays. With circular arrays as depicted in the figures, the discrete steps may each correspond to a certain angular rotation between the two parts. It will be appreciated that instead of circular arrays, linear arrays could be used to adjust the relative positioning and each discrete step would correspond to the distance between notches.

In the example of FIGS. 2a and 2b, the inner adjustment mechanism 108 between the first mount part 101 and the second mount part 102 is a discrete, vernier adjustment mechanism. Each of the first mount part 101 and the second mount part 102 is provided with an array of notches 108a, 108b (specifically circular arcs forming semi-circles or near-semi-circles in this example). The arrays 108a, 108b are circular arrays provided around the circular border between the first mount part 101 and the second mount part 102. In this example, each array 108a, 108b has twenty-one notches, but that is purely exemplary. It is not required that both arrays have the same number of notches. The relative orientation of the first mount part 101 with respect to the second mount part 102 is determined by aligning a selected notch of one array 108a with a selected notch of the other array 108b. The particular selections from each array determine the relative orientation. When aligned, the two selected notches together form a hole (a circular hole in this example) into which a pin (not shown) of matching diameter can be inserted such that it bridges the join between the two selected notches and prevents relative rotation of the first mount part 101 relative to the second mount part 102. This adjustment mechanism 108 is a vernier mechanism. The spacing between notches is such that when one pair of notches from the opposed arrays 108a, 108b (i.e. one notch from one array 108a and one notch from the opposed array 108b) is aligned, adjacent pairs of notches are misaligned. In a typical vernier mechanism in which the notches in each array are evenly spaced (but with the spacing of one array being greater than the spacing of the other array), the immediately adjacent pair to the aligned pair are mis-aligned by an offset. The next-most-adjacent pair are mis-aligned by twice that offset and so on. Alignment is still adjusted in discrete steps, like the non-vernier adjustment mechanism 107, but with the vernier mechanism 108, much finer adjustments can be made. The difference in alignment between two adjacent pairs of notches is equal to the difference in spacing between the two arrays 108, 108b. Thus a fine adjustment can be made by moving the two parts (first mount part 101 and second mount part 102) just enough to correct the offset in the adjacent pair and using that newly aligned pair of notches to set the relative position with a pin (not shown) as described above. With circular arrays as depicted in the figures, the discrete steps may each correspond to a certain angular rotation between the two parts. It will be appreciated that instead of circular arrays, linear arrays could be used to adjust the relative positioning and each discrete step would correspond to a translational distance.

As shown in FIGS. 2a, 2b (first example) and 3b (second example), the first mount part 101 is mounted in an offset (off-centre) position in second mount part 102. The effect of this is that rotation of second mount part 102 relative to support 103 has a translational effect on first mount part 101 and therefore on the sensor part (e.g. magnet) mounted therein. As is best illustrated in FIG. 3b, this rotational adjustment via adjustment mechanism 107 will vary the distance between the sensor part and the sensor in the direction indicated by arrow 110. On the other hand, as shown in FIGS. 2a and 2b, the sensor part is mounted in recess 104 centrally within first mount part 101 (although this feature is only shown in relation to the first example, it may equally be applied to the second example). Therefore rotational adjustment via adjustment mechanism 108 will vary the orientation of the sensor part in recess 104 with respect to the other sensor part 105.

The above-described sensor mount 100 advantageously provides a mechanical calibration mechanism for adjusting the relative position of the sensor parts such that the distance and relative orientation of the two parts is consistent between devices (i.e. consistent between installations), and thus the output signal will also be consistent without the need for further signal calibration in hardware or software by the signal acquisition system after installation. Positioning errors that arise due to manufacturing and assembly tolerances can thus be compensated by adjusting the sensor mount 100 via the two adjustment mechanisms 107, 108.

The adjustments of mechanisms 107, 108 can be performed in either order, but in the examples illustrated here it is preferred to perform the translational adjustment first. This is because the translational adjustment is achieved via a rotational adjustment mechanism and may thus also have a small rotational component to the adjustment. The purely rotational adjustment of adjustment mechanism 108 can then be used to compensate for any rotation induced by the first adjustment mechanism 107.

Figure 4A:
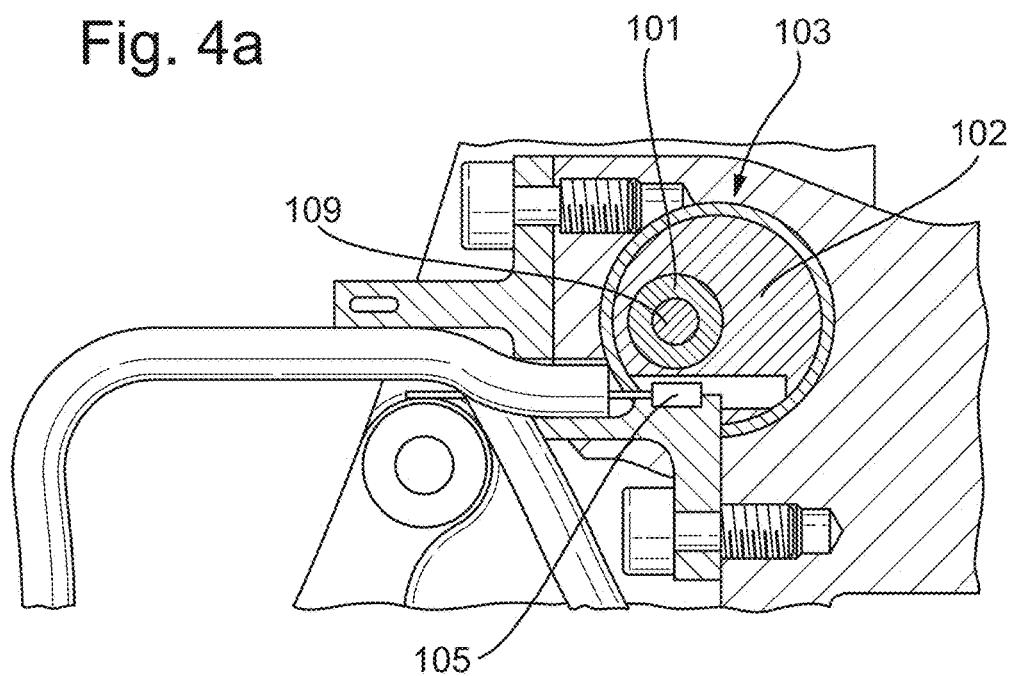
FIGS. 4a and 4b show further views of the second example.
Figure 4B:
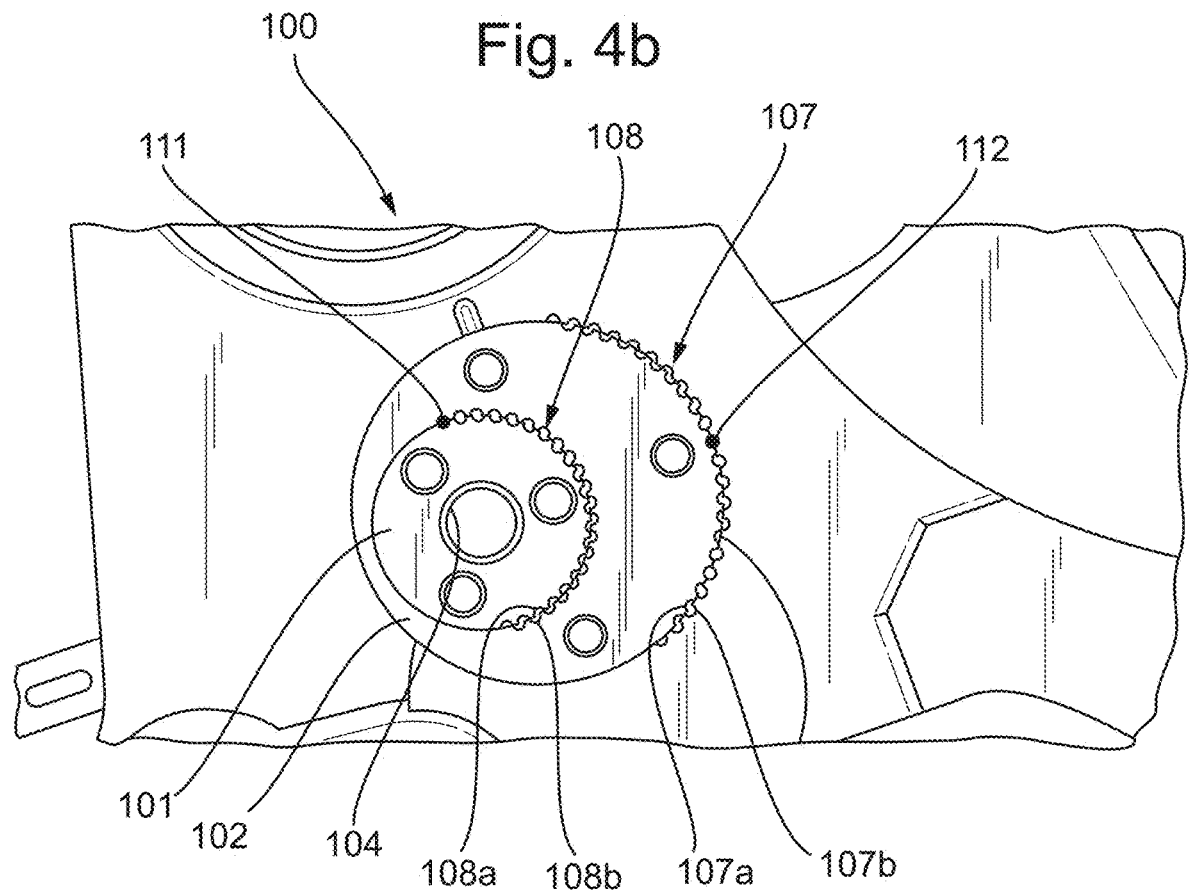

FIGS. 4a and 4b show the second example sensor mount 100. FIG. 4a is similar to FIG. 3b. FIG. 4b is similar to FIG. 2b. The sensor mount 100 of the second example is similar in many respects to the sensor mount 100 of the first example and the similar features will therefore not be fully described again. The main difference is that the first adjustment mechanism 107 of the second example is also a vernier adjustment mechanism such that the sensor mount 100 of the second example has two vernier adjustment mechanisms, one for translational adjustment and one for purely rotational adjustment. The use of a vernier adjustment mechanism for the first adjustment mechanism 107 provides for finer translational adjustment and thus better accuracy. This vernier adjustment mechanism operates in the same way as the vernier adjustment mechanism 108 described above in relation to the first example.

FIG. 4b additionally shows a pin 111 inserted into a hole formed by the two most anti-clockwise notches of the two arrays 108a, 108b of the inner adjustment mechanism 108. FIG. 4b also shows a pin 112 inserted into a hole formed by two notches in approximately the middle of the two arrays 107a, 107b of the outer adjustment mechanism 107. These pins bridge the join between their respective arrays and thus prevent further relative rotation of the parts on either side of the join. A magnet 109 fixed into the recess 104 of first mount part 101 is thus accurately translationally and rotationally fixed with respect to Hall sensor 105 so that a consistent output can be obtained without further calibration.

The above examples illustrate how an extremely accurate mechanical adjustment can be used to compensate for tolerances and calibrate sensor devices with minimal additional structure. The adjustment mechanisms require very little additional space around the sensor parts 105, 109 and can thus be efficiently installed in tight and/or compact spaces without affecting the overall size of the apparatus. Additionally very little (if any) additional weight is added by these sensor mounts, making them highly efficient and advantageous.

In one example, the sensor is installed in a pivot lever that is part of an electro-mechanical actuator. The sensor design is based on a linear hall effect sensor measuring the magnetic field produced by a diametrically magnetized neodymium magnet 109. The sensor is fixed to the support 103 and the magnet 109 moves with the lever mechanism 201 as shown with the arrow 106 in FIG. 2b. The sensor produces an output voltage proportional to the magnetic field which is determined by the linear position of the magnet 109 across the Hall sensor 105. The output voltage of the Hall sensor 105 is determined by both the polarity and distance of the magnet 109 from the sensor 105. The installation can be mechanically calibrated by monitoring the output of the Hall sensor 105 while adjusting the first and second adjustment mechanisms 107, 108 until a desired output is achieved.

Another advantage is that the examples described here can use off the shelf magnets and hall sensors (or other off the shelf sensor components). This contributes to keeping the cost of the assembly very low in comparison to other sensors. For example, other aerospace position sensors are often more complex and expensive.

The design of the vernier scale(s) can be adjusted to change the increment between setting points depending on the accuracy required.

It will be appreciated that, although the examples above are described with notches and pins for defining alignment between two mounting parts, this should not be considered as limiting and other adjustment points or position-defining points can be used. For example projections or lugs on each mounting part (or support) could be connected together to define a relative position. Equally a projection could be fixed in relation to a notch with a suitably shaped connecting member.

The invention claimed is:

1. A mount for a sensor, comprising:
a first mount part for mounting a sensor part; wherein the first mount part is an inner or a central mount part, and
a second mount part for mounting the first mount part; wherein the second mount part is an outer mount part;
wherein a first adjustment mechanism is provided to adjust the first mount part relative to the second mount part and a second adjustment mechanism is provided to adjust the second mount part relative to a support;
wherein at least one of the first adjustment mechanism and the second adjustment mechanism is a discrete vernier adjustment mechanism;
wherein the discrete vernier adjustment mechanism comprises a first array of first alignment features being spaced apart by a first spacing and a second array of second alignment features being spaced apart by a second spacing different from the first spacing, the arrays being arranged such that alignment of a selected one of the first alignment features with a selected one of the second alignment features defines the adjustment of the discrete vernier adjustment mechanism; and
wherein the selected first alignment feature is arranged to be fixed in alignment with the selected second alignment feature so as to prevent or restrict relative movement of one array relative to the other.

2. The mount for a sensor as claimed in claim 1, wherein the first alignment features are notches.

3. The mount for a sensor as claimed in claim 1, wherein the second alignment features are notches.

4. The mount for a sensor as claimed in claim 3, further comprising a pin insertable into the notches such that it is partially enclosed by both a selected one of a first notches and a selected one of a second notches of the notches.

5. The mount for a sensor as claimed in claim 1, wherein the discrete vernier adjustment mechanism is a circular vernier adjustment mechanism.

6. The mount for a sensor as claimed in claim 5, the first array of first alignment features forming a circular arc and being spaced apart by the first spacing and the second array of second alignment features forming a circular arc and being spaced apart by the second spacing different from the first spacing, the arrays being arranged such that alignment of the selected one of the first alignment features with the selected one of the second alignment features defines the adjustment of the discrete vernier adjustment mechanism.

7. The mount for a sensor as claimed in claim 1, wherein one of the first and second adjustment mechanisms is arranged to adjust an orientation of the sensor part and the other of the first and second adjustment mechanisms is arranged to adjust a position of the sensor part relative to the support.

8. The mount for a sensor as claimed in claim 1, wherein the discrete vernier adjustment mechanism is arranged to adjust an orientation of the sensor part.

9. The mount for a sensor as claimed in claim 1, wherein the first adjustment mechanism is the discrete vernier adjustment mechanism arranged to adjust an orientation of the sensor part.

10. The mount for a sensor as claimed in claim 1, wherein both the first adjustment mechanism and the second adjustment mechanism are discrete vernier adjustment mechanisms.

11. The mount for a sensor as claimed in claim 1, wherein the second mount part is circular and wherein the first mount part is mounted off center in the second mount part.

12. A sensor in combination with a mount, wherein the mount comprising:
  a first mount part for mounting a sensor part; wherein the first mount part is an inner or a central mount part, and
  a second mount part for mounting the first mount part; wherein the second mount part is an outer mount part;
  wherein a first adjustment mechanism is provided to adjust the first mount part relative to the second mount part and a second adjustment mechanism is provided to adjust the second mount part relative to a support;
  wherein at least one of the first adjustment mechanism and the second adjustment mechanism is a discrete vernier adjustment mechanism;
  wherein the discrete vernier adjustment mechanism comprises a first array of first alignment features being spaced apart by a first spacing and a second array of second alignment features being spaced apart by a second spacing different from the first spacing, the arrays being arranged such that alignment of a selected one of the first alignment features with a selected one of the second alignment features defines the adjustment of the discrete vernier adjustment mechanism; and
  wherein the selected first alignment feature is arranged to be fixed in alignment with the selected second alignment feature so as to prevent or restrict relative movement of one array relative to the other.

13. A hall effect sensor comprising a magnet, a detector and a mount; wherein the mount comprising:
  a first mount part for mounting a sensor part; wherein the first mount part is an inner or a central mount part, and
  a second mount part for mounting the first mount part; wherein the second mount part is an outer mount part;
  wherein a first adjustment mechanism is provided to adjust the first mount part relative to the second mount part and a second adjustment mechanism is provided to adjust the second mount part relative to a support;
  wherein at least one of the first adjustment mechanism and the second adjustment mechanism is a discrete vernier adjustment mechanism;
  wherein the discrete vernier adjustment mechanism comprises a first array of first alignment features being spaced apart by a first spacing and a second array of second alignment features being spaced apart by a second spacing different from the first spacing, the arrays being arranged such that alignment of a selected one of the first alignment features with a selected one of the second alignment features defines the adjustment of the discrete vernier adjustment mechanism;
  wherein the selected first alignment feature is arranged to be fixed in alignment with the selected second alignment feature so as to prevent or restrict relative movement of one array relative to the other; and
  wherein one of the magnet and the detector is mounted in the first mount part and is adjustable relative to the other of the magnet and detector.

* * * * *